US012774898B2

(12) United States Patent
Schneider

(10) Patent No.: US 12,774,898 B2
(45) Date of Patent: Oct. 27, 2026

(54) METHOD FOR RECORDING GATHERED ENVIRONMENTAL DATA

(71) Applicant: MERCEDES-BENZ GROUP AG, Stuttgart (DE)

(72) Inventor: Christian Schneider, Radolfzell am Bodensee (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/155,732

(22) PCT Filed: Jan. 26, 2024

(86) PCT No.: PCT/EP2024/051968
§ 371 (c)(1), (2) Date: Aug. 12, 2025

(87) PCT Pub. No.: WO2024/170257
PCT Pub. Date: Aug. 22, 2024

(65) Prior Publication Data

US 2026/0118135 A1 Apr. 30, 2026

(30) Foreign Application Priority Data

Feb. 13, 2023 (DE) ..................... 10 2023 000 469.3

(51) Int. Cl.
*G01C 21/00* (2006.01)
*G06F 16/29* (2019.01)

(52) U.S. Cl.
CPC ..... *G01C 21/3815* (2020.08); *G01C 21/3867* (2020.08); *G01C 21/387* (2020.08); *G01C 21/3885* (2020.08); *G06F 16/29* (2019.01)

(58) Field of Classification Search
CPC ............ G01C 21/3815; G01C 21/3867; G01C 21/387; G01C 21/3885; G01C 21/3841; G06F 16/29
See application file for complete search history.

(56) References Cited

U.S. PATENT DOCUMENTS 11,972,015 B2 4/2024 Herman et al.
2007/0021912 A1* 1/2007 Morita .............. G01C 21/3602 701/431

(Continued)

FOREIGN PATENT DOCUMENTS

DE 102016120116 A1 4/2018
DE 102019206147 A1 11/2020

(Continued)

OTHER PUBLICATIONS

Office Action dated Sep. 30, 2025 in related/corresponding KR Application No. 10-2025-7026569.

(Continued)

*Primary Examiner* — Daryl C Pope
(74) *Attorney, Agent, or Firm* — PATENT PORTFOLIO BUILDERS PLLC

(57) ABSTRACT

A vehicle uses environmental sensors to gather and record environmental data, which is transmitted to a vehicle-external server after it has been recorded. A public and a non-public category of the road being traversed by the vehicle is taken into account from an existing database. In the case of a public road, a characteristic depiction of the public road is determined using the database and is overlaid on the gathered environmental data with positional accuracy. The gathered environmental data is only ever recorded if the vehicle is on a road that is categorized as public, or if at least one part of the overlaid characteristic depiction of the public (Continued)

road can be identified in the environmental data gathered by at least one environmental sensor of the vehicle.

16 Claims, 2 Drawing Sheets

(56) References Cited

U.S. PATENT DOCUMENTS

| | | | |
|---|---|---|---|
| 2013/0108105 | A1 | 5/2013 | Yoo et al. |
| 2019/0146500 | A1 | 5/2019 | Yalla et al. |
| 2019/0271550 | A1 | 9/2019 | Breed et al. |
| 2020/0012867 | A1 | 1/2020 | Thompson et al. |
| 2021/0192841 | A1 | 6/2021 | Hu et al. |
| 2021/0381838 | A1 | 12/2021 | Cajias et al. |
| 2022/0315023 | A1 | 10/2022 | Ishii et al. |
| 2022/0382903 | A1 | 12/2022 | Herman et al. |

FOREIGN PATENT DOCUMENTS

| | | | |
|---|---|---|---|
| DE | 112020002312 | T5 | 2/2022 |
| DE | 102021112804 | A1 | 11/2022 |
| DE | 102022113361 | A1 | 12/2022 |
| EP | 3875910 | A1 | 9/2021 |
| EP | 4318434 | A1 | 2/2024 |
| JP | 2017049683 | A | 3/2017 |
| JP | 2019178888 | A | 10/2019 |
| KR | 20190120663 | A | 10/2019 |
| WO | 2020156923 | A2 | 8/2020 |
| WO | 2022201343 | A1 | 9/2022 |

OTHER PUBLICATIONS

Office Action dated Mar. 17, 2026 in related/corresponding JP Application No. 2025-546454.

Decision to Grant dated May 9, 2025 in related/corresponding EP Application No. 24702711.3.

International Search Report and Written Opinion mailed May 16, 2024 in related/corresponding International Application No. PCT/EP2024/051968.

Office Action created Jan. 5, 2024 in related/corresponding DE Application No. 10 2023 000 469.3.

Office Action dated May 21, 2026 in related/corresponding KR Application No. 10-2025-7026569.

* cited by examiner

METHOD FOR RECORDING GATHERED ENVIRONMENTAL DATA

BACKGROUND AND SUMMARY OF THE INVENTION

Exemplary embodiments of the invention relate to a method for recording gathered environmental data.

Current driver assistance systems use a plurality of algorithms, for example to reconstruct the vehicle environment three-dimensionally. Furthermore, the algorithms extrapolate the movement of the ego vehicle or predict the motion trajectory of road users. In current-generation vehicles, algorithms are typically rule-based. This leads to the need for initial parameterization. To overcome this and to be able to optimally adapt the algorithms to real scenarios, there is already towards data-driven algorithms. Mention can be made of ResNet, Yolo or AutoNet as examples of this. However, such deep learning approaches involve a considerable amount of training effort, which in turn has to be supported on a large database, which can comprise several thousand training hours. Each of these training datasets is acquired in the current generation across a large fleet of vehicles worldwide. However, this acquisition is limited to the public road network and to contrived scenarios within the manufacturers'own testing centers. In addition, in principle there is also the possibility of generating training data virtually, but this is typically based on relevant experiences and therefore frequently contains scenarios that are encountered above all in public areas.

In practice, however, vehicles do not move exclusively on the public road network, but also in private, non-public areas. Mention can be made here by way of example of parking facilities, driving into garages and the like. In such private scenarios, objects are encountered that are only very rarely observed on the public road network. Examples could be a child on a ride-on toy car or a rainwater gutter next to a garage entrance. If such objects are not part of the initial dataset acquired in the field, there may not be sufficient training for such scenarios, which could ultimately lead to a restricted functionality and/or a safety risk.

A current approach involves gathering data in principle anywhere across the vehicle fleet. This data is then—usually after temporary storage in the vehicle gathering the data—copied from time to time to a vehicle-external server, for example a cloud storage system, and processed further there. A great deal of effort is then needed to sort out data—which was previously gathered and transmitted in a laborious and expensive manner—because it may not be allowed to be used for legal reasons since it was gathered, for example, in a non-public, i.e., private environment and is subject to special data protection.

This involves a lot of resources, is laborious and expensive.

One possible way of still being able to use some of the data consists substantially in making sensitive private information unidentifiable, by pixelating people's faces, for example. In this connection, reference can be made to US 2013/0108105 A1 or similarly to KR 10 2019 0 120 663 A. A problem in this case is that the data collected previously then needs to be resource-intensively pixelated in the relevant areas and transmitted to the server. This therefore exacerbates the above-described disadvantages and makes such a method even more data- and resource-intensive.

For further general prior art, reference can moreover be made to the so-called histogram of oriented gradients (HOG), using which, for example, edges and similar object-relevant information can be generated very efficiently. Purely by way of example, mention is made in this regard of US 2020/0012867 A1, which deals with such HOG to differentiate between sections that can and cannot be traversed by a vehicle.

Exemplary embodiments of the present invention are directed to an efficient method in the above-described sense, which can reduce the amount of data to be transmitted.

In the method according to the invention, the recording of environmental data, which then later needs to be copied to a vehicle-external server, only ever takes place if this data may also actually be used for the creation of training data. For this, the method according to the invention uses a categorization of the roads being traversed by the vehicle as public or non-public roads. In the case of a public road, the data can be recorded. This data is recorded and later correspondingly transmitted. If a non-public road or a road with an unclear categorization is being traversed, according to a preferred refinement of the method according to the invention, further information can be retrieved by the vehicle, for example from a backend server, in order to define the categorization more precisely. If this is not possible, according to this refinement, the road is categorized as non-public.

This is where the method according to the invention comes into play. Using the database, which in particular can comprise SD or HD map material, a characteristic image of the public road is created. This characteristic image, for the creation of which there are various conceivable possibilities, is then overlaid with positional accuracy on the gathered environmental data, e.g., a camera image, via an intrinsic and extrinsic calibration of the environmental sensors. There is therefore an overlay of the virtual characteristic image from the data material on the one hand and of the image of the reality gathered by the environmental sensors on the other hand. The gathered environmental data is now recorded only if—as already set out above—the vehicle is driving on a road that has unequivocally been categorized as public or if at least a part the overlaid characteristic depiction of the public road can be identified in the environmental data gathered by at least one environmental sensor.

Therefore, the virtual characteristic image of the public road as viewed from the position of the vehicle, which image can be gathered via GPS, can be compared in a computer-based comparison with the image of the environment generated by an environmental sensor of the vehicle. As long as part of the characteristic image of the public road can still be seen in this image, the vehicle has visual contact with the public road, so that it can be assumed therefrom that the vehicle can still be identified from the public road even in the reverse direction. The immediate surroundings of the vehicle can therefore also be seen from the public road, even if the vehicle is moving on a section of road categorized as private or non-public or unclearly categorized. Therefore, the environmental data can continue to be recorded and used later. If there is no longer any visual contact with the public road, for example due to static objects such as fences, hedges, walls or the like, then no part of the characteristic image of the public road can be identified in all of the environmental data from all of the vehicle's environmental sensors. In this case, the vehicle is therefore not in visual contact with the public road and therefore clearly in an area that is to be considered as private or non-public. The recording is then stopped so that no data is gathered in this area, meaning that such no data needs to be transmitted.

Therefore, the data is already checked in the vehicle itself for potential usability, so that only data that can also be used later is gathered and recorded. This reduces the amount of data that needs to be transmitted to a backend server. This gives rise to a considerable technical advantage regarding the amounts of data to be transferred and the data rates needed for the transmission.

As already mentioned, the identification of the characteristic depiction of the public road in the gathered environmental data can take place quickly and reliably via a computational comparison. The database itself can be designed as a map and normally already directly or indirectly includes the categorization into public and non-public roads, since here, for example, federal highways, motorways or the like are categorized as such, and this categorization can clearly be assigned to a public category of road. In the case of an unclear categorization, additional information can be retrieved from a vehicle-external server, such as, for example, the backend server of the vehicle manufacturer, in order to carry out the categorization in the vehicle. If this does not result in an unequivocal public categorization, then, according to this preferred refinement, the road should always be categorized as non-public, so as not to generate any data for later use and to minimize the amount of gathered and recorded data which needs to be transmitted later, in the context of the invention.

There are now various options that can be combined or interchanged as required to generate the characteristic depiction of the public road.

According to a first very advantageous embodiment of the method according to the invention, the characteristic depiction of the public road is formed by a series of anchor points formed along the course of the public road using the database, in particular the map material. If these anchor points are overlaid as a characteristic depiction of the public road with positional accuracy on the gathered data, or images if the environmental sensor is a camera, it can then be checked whether at least one of these anchor points can be identified in the environmental data. If yes, data can be recorded; if not, recording is stopped.

According to a very advantageous refinement hereof, it can be provided that a window is formed around each of the anchor points, for the area of which window the identifiability is accordingly checked.

The use of anchor points has the decisive advantage here that, as is also provided according to a very favorable refinement of the method according to the invention, those anchor points, which, when viewed from the gathered position of the vehicle, can already be identified in the map material as being concealed by objects, are not taken into account. Therefore the data processing effort needed for the check is reduced. Nevertheless, a very differentiated check is still possible, because a window lying around this anchor point is advantageously used for each anchor point.

Additionally or alternatively thereto, a characteristic depiction of the public road can also be formed by a so-called traverse or spline along the road. In contrast to the individual anchor points, this offers the advantage that it can be checked as a whole with regard to the identifiability, however small individual concealments can very quickly lead to a mismatch between the spline and the view in the gathered environmental data, so that according to a very advantageous refinement thereof, if the course of the traverse is partially concealed by objects that can be identified in the database when viewed from the position of the vehicle, the traverse is divided into multiple part-traverses, so that the concealed objects are omitted. The identifiability in the gathered environmental data can then be carried out according to a very favorable design for the entire traverse or, if this is divided into part-traverses, for each of the part-traverses.

A further way of generating the characteristic depiction of the public road is to use an image of the road itself, in particular its surface. This image can then be compared section by section with the gathered environmental data, wherein each section comprises at least one pixel, so that, for example, a pixel-wise comparison of the gathered environmental data with the positionally accurate characteristic image overlaid thereon can be carried out. In the case of such a characteristic image by means of a pixel-accurate depiction of at least the surface of the road, according to a very advantageous refinement, dynamic objects can be identified, for example vehicles or pedestrians can be identified, which can be categorized as such in a conventional manner. Such moving objects are then assigned to individual areas in the gathered data, with these areas being excluded from the check, since the moving objects mean that they do not offer sufficiently relevant information for use of the check.

It is particularly favorable here if, according to a very advantageous design of the method according to the invention, gradients of the characteristic depiction are calculated, wherein a histogram of oriented gradients is calculated for several areas, such as in particular windows, of the characteristic depiction, whereupon the similarity of the histogram of oriented gradients to an initial vector of the road from the database is calculated for each of the areas. For example, such an initial vector can be a vector at the anchor point if anchor points are used for the characteristic depiction. Otherwise, it could in principle also be calculated using a further histogram of oriented gradients on the basis of the data in the database for the respective road.

The comparison can be carried out according to a very favorable design as a comparison of the steepest vectors of this histogram of oriented gradients.

The entire method can now typically be carried out in the vehicle so as to easily and efficiently be able to decide, prior to recording the data, whether the data actually needs to be recorded or not. This helps to save memory space and to avoid having to later transmit unnecessary recorded data. It is also the case that to reduce the amount of effort involved in the transmission of data, according to a very favorable design of the method according to the invention, the respective relevant data packet can also be downloaded from the database, i.e., that section of the public road of which a characteristic depiction is to be created. If, for example, the vehicle turns into a private road, a street where children can play or the like, then this already downloaded area can be accessed easily and efficiently in order to create the required characteristic depiction to be overlaid with positional accuracy on the gathered environmental data, such as lidar data, camera images or the like, depending on the position of the vehicle.

BRIEF DESCRIPTION OF THE DRAWING FIGURES

Further advantageous designs of the method according to the invention will also become apparent from the exemplary embodiment, which is elucidated in more detail hereinafter with reference to the figures, in which.

DETAILED DESCRIPTION

As mentioned in the introduction, data gathered in the context of a conventional data collection for generating training data on private property may not be used straight away without permission. If data is nevertheless gathered, for example by a vehicle 1 having environmental sensors 2 as is indicated in the illustration in FIG. 1, then this data is nevertheless temporarily stored in the vehicle 1 and transmitted from time to time to a vehicle-external server, for example a backend server of the vehicle manufacturer. This is indicated in the illustration in FIG. 1 as a cloud with the reference sign 3.

This gathered and recorded data that is later transmitted to the cloud 3, which data cannot be used, requires corresponding resources for storage, but in particular also for the transmission of the data from the vehicle 1 to the cloud 3. Therefore, transmission processes need to be performed more frequently and a comparatively large amount of data is transmitted in total, which necessitates a correspondingly large storage capacity and/or data connection bandwidth.

Figure 1:
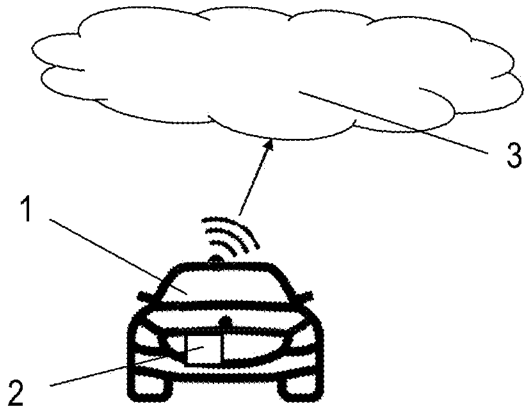
FIG. 1 shows a schematic view of a vehicle and a vehicle-external server in the form of a cloud.

The vehicle 1 in the schematic illustration of FIG. 1 is now intended to have a logic system that takes into account a differentiation between private, i.e., non-public, and public areas and accordingly controls the collection of the data adaptively. This can therefore prevent unusable data from being recorded and/or transmitted, in order to reduce the amount of data both in temporary storage and that is transmitted to the cloud 3.

As environmental 2 for gathering the data, use can be made, for example, of a camera system of the vehicle, which consists of various cameras, for example of a front camera, of parking cameras and the like. Other types of environmental sensors 2, such as lidar sensors or similar, are also conceivable as an alternative to or in particular in addition to a camera system.

Fundamental to the implementation of the method is the gathering and provision of environmental data via these environmental sensors 2. In the flow chart shown in FIG. 2 for an example of such a method, this provision of sensor data is indicated by the first method step labelled with 100. The procedure then provides in a second method step 200 for individual roads to first be classified accordingly as public road types or as non-public road types on the basis of SD or HD map material. A simple classification, which can be performed directly in the vehicle 1, would be, for example, to classify motorways and country roads as public, but not play streets, entranceways and the like. The classification may have already been made available by the provider of the map material, which is frequently typically the case with map material nowadays. However, in principle, it is also possible for the vehicle 1 to additionally retrieve further information, for example from its backend server, i.e., the cloud 3, in order to be able to perform this categorization automatically and/or define it in more detail.

Figure 3:
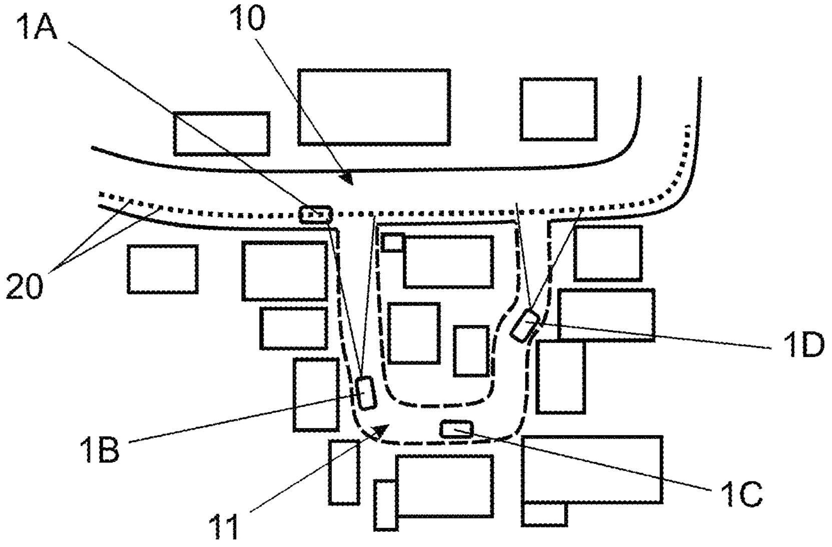
FIG. 3 a plan view of roads and various positions of a vehicle to help visualize relevant method steps from the illustration in FIG. 2.

In the diagram of FIG. 3 chosen to explain some method steps, such a public road is shown purely by way of example and has the reference sign 10. The road 10 passes between individual buildings, not provided here with reference signs and indicated as rectangles in a plan view, and is shown with a solid line to indicate its characterization as a public road 10. In addition, a non-public road is indicated in the illustration of FIG. 3, for example a street where children can play. This road passes between the houses in a substantially U-shaped course starting from the public road 10 and later leads back into the latter. This non-public road is identified with the reference sign 11.

The next step 300 of the method now involves forming a characteristic depiction of the public roads 10 from the map material, and specifically in particular in those areas in which the non-public road 11 branches off and rejoins. Purely by way of example, this is to take place here using a series of individual anchor points 20, which are positioned along the public road 10. Some of these anchor points 20 are indicated in the illustration in FIG. 3. To simplify the illustration, however, only two of them have been given a reference sign. These anchor points 20 can now be generated with a previously defined spacing, which in particular can also depend on the category of the public road 10 or the structural features typically used there, such as the typical road width or the like. These individual anchor points 20 now have a defined direction vector. This corresponds to the direction angle, typically referred to as yaw angle, in the road plane, which can also be calculated accordingly on a two-dimensional map.

This data can be calculated and be made available via the backend 3 so that, in an optional interposed method step 400 of the method, this data can be downloaded for the environment currently under consideration, for example the image section shown in FIG. 3. This reduces the bandwidth needed for the data transmission in the subsequent method steps and also enables this to be carried out autonomously in the vehicle 1, thus for example even if there is no or only a very restricted data connection to the cloud 3.

In the fifth method step 500, based on the movement of the vehicle 1 itself, which can be extrapolated, for example, by GPS and appropriate motion sensors of the vehicle 1, these anchor points 20 are now projected into the coordinate system of the vehicle 1. The individual anchor points 20 can therefore be projected into the gathered environmental data, for example the camera image plane of the vehicle 1, on the basis of extrinsic and intrinsic calibration information.

The respective gradients can then be extrapolated in the subsequent method step 600 in a defined window around each of the projected anchor points 20. This defined window can have a window width, which, for example, is half the distance between the anchor points 20, which are intended to be, for example, of an order of magnitude of a few tens of centimeters up to a few meters for the exemplary embodiment shown here. In the subsequent step, step 700, a histogram of oriented gradients is then created in a manner known per se. This histogram of oriented gradients, which is also referred to as HOG, is computed for each of the previously projected anchor points 20 in a predefined area, for example in a defined window, around this anchor point 20 in the gathered environmental data, for example the camera images. The direction of the steepest gradient can then be gathered from this histogram of oriented gradients. It is useful to lay a Gaussian distribution over the histogram of oriented gradients in order to derive a standard deviation or the full width at half maximum.

In method step 800, the similarity of this histogram of oriented gradients—in this case what is essentially meant is the steepest vector, which is also referred to as a HOGs vector—to the initial direction vector from the map data is now compared according to the above-described embodiment. In this case, it is particularly useful to take the standard deviation into account, since the environmental sensors 2 of the vehicle 1 can also be used to record further road users or dynamic objects, which are not taken into account in the map. This in turn leads to more gradients in individual windows, whereby the standard deviation is expected to rise and the meaningfulness of the value in this window is reduced. Such a window, which is less meaningful due to the dynamic object, is thus also taken into account to a lesser degree.

Figure 2:
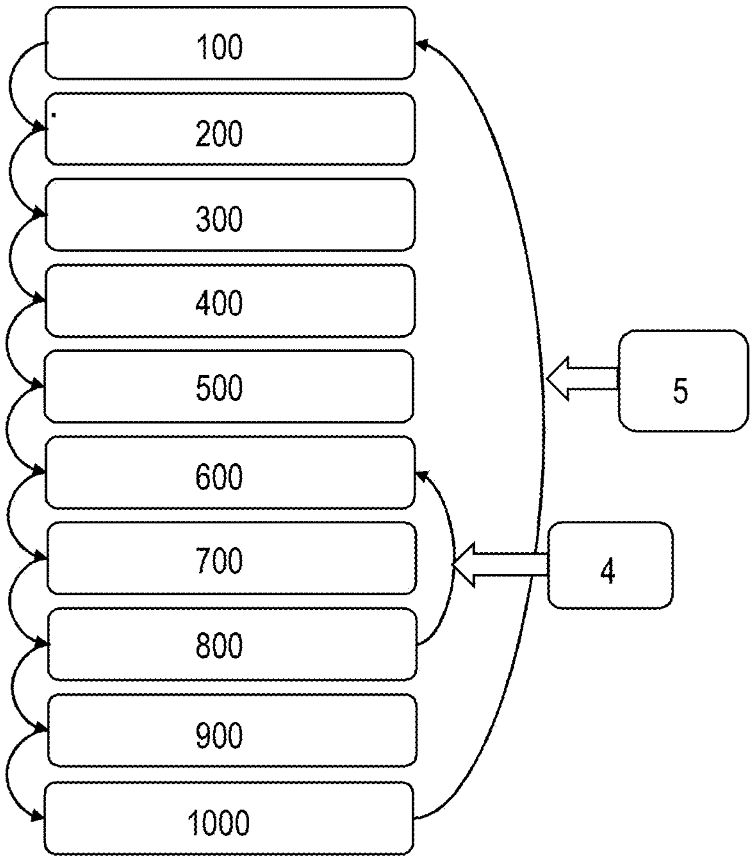
FIG. 2 shows the steps involved in an example of one possible way of realizing the method according to the invention.

Each individual calculation is correspondingly carried out for all windows or all projected anchor points 20 in the environmental data gathered by the vehicle 1 or its environmental sensors 2. This procedure for the calculation of the HOG is indicated in the diagram of FIG. 2 by repeating the steps 600, 700 and 800 in accordance with the box labelled with 4.

The similarity of the individual vectors is accumulated in the following method step 900 accordingly and normalized by the amount of the anchor points 20 under consideration, so that a binary classification can be carried out using previously empirically defined threshold values. If the similarity is above the threshold value, the method step 800, for example, returns a value of “1”; otherwise the value is “0”. Therefore, all previously performed calculations for all individual windows and for all camera systems are consolidated in this method step.

The generated value is now forwarded to the method step 1000 as a trigger criterion. It is used there as a trigger criterion for recording the gathered data. This recording is thus triggered whenever one of the anchor points 20 can still be seen by any sensor (e.g., a camera) of the environmental sensors 2 of the vehicle 1. Therefore as long as a part of the public road 10 can be identified from the vehicle 1, the data can be recorded, which is then later transmitted to the cloud 3, as will be explained in more detail hereinafter with reference to FIG. 3.

This entire method sequence is then, as is indicated via the box 5, repeated again and again, in order to ensure over time as well that only data that can actually be used is recorded, so as to thus minimize memory resources and, in particular, resources for transmitting the data to the cloud 3 and so that a logic system in the vehicle 1 can use the method to make an automated decision as to whether or not this data can be gathered and used later.

As already mentioned, FIG. 3 visualizes in a bird’s eye perspective a scenario for explaining the method, wherein here different positions of the vehicle 1 are shown. These individual positions of the vehicle 1 will be discussed hereinafter and are accordingly labelled with the letters A to D. The first position of the vehicle 1 to be discussed is labelled A, so that here the vehicle 1 is given the reference sign 1A. The vehicle 1 in this position A is situated on the public road 10, for example travelling from left to right, and wants to turn off into the non-public road 11. The anchor points 20 are schematically indicated on the public road 10 in the above-described way. As long as the vehicle 1 is moving on the public road 10, the gathered data is in each case recorded and accordingly transmitted later. As soon as the vehicle 1 turns into the non-public road 11, it is up to the logic system to decide whether the gathered data should continue to be recorded or not.

A first example is the position of the vehicle 1 labelled with B here. In this position, the individual anchor points 20 in the intersection between the two roads 10, 11 are now overlaid with positional accuracy on the gathered data, here for example on the images from reversing cameras. By way of example, via the above-described similarity measurement using the histogram of oriented gradients, it can now be established that in the position B of the vehicle 1 at least some of the anchor points 20 on the public road 10 can still be identified in the gathered environmental data. The area around the position B can therefore still be seen from the public road 10, which means that gathering the data in this area is useful and permissible. Therefore, the gathered environmental data is recorded here.

In the position C of the vehicle 1, the situation is now different. From this position, the similarity measurement is unable to make any of the anchor points 20 or any of its gradients be a sufficiently similar match to the gradients in the gathered environmental data. The public road 10 and the anchor points 20 characteristically depicting it cannot be identified when looking from the vehicle 1 in the position C. The recording of the gathered data is accordingly stopped, in order to save on storage capacity and transmission capacity during the later transmission to the cloud 3 by reducing the amount of data.

If the vehicle 1 now reaches the position D in the illustration of FIG. 3, individual anchor points 20 on the public road 10 can be identified once again in the gathered environmental data, here for example in the camera images of the front parking cameras or also a forward-directed main camera of the vehicle. The similarity measurement therefore delivers a positives result, so that a value “1” is forwarded from method step 900 to method step 1000, and thus recording of the gathered data is restarted.

Of course, in practice, a continual or at least minimally interrupted check will take place within the non-public road 11, and the three positions B, C, D shown here of vehicle 1 serve only for explanatory purposes.

In this case, the above-described similarity measurement via the histograms of oriented gradients is to be understood merely as an example. Other characteristic depictions could also be used as a characteristic depiction of the public road 10, in particular in the respective intersections. Thus, for example, a spline, i.e., a traverse, along the public road 10 could be used and correspondingly searched for in the gathered image, in which it is overlaid with positional accuracy, using a search mask. Furthermore, it would be conceivable to use a semantic segmentation of the camera and to compare the pixel-exact semantic information with the projected information from the map material. Here, the characteristic image would therefore be an image of the entire road, in particular in its surface, which is directly compared in individual areas, in particular in areas of pixel size, in order to verify the visibility of the public road 10 from the respective position B, C, D of the vehicle 1 on the non-public road 11.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:

gathering, by a vehicle using environmental sensors of the vehicle, environmental data;

recording, by the vehicle, the gathered environmental data; and transmitting, by the vehicle to a vehicle-external server, the recorded gathered environmental data after the gathered environmental data after has been recorded and accounting for a public and a non-public category of a road, from an existing database, being traversed by the vehicle, wherein the accounting for the public category of the road involves determining a characteristic depiction of the public road using the existing database and overlying the characteristic depiction with the gathered environmental data with positional accuracy, wherein the gathered environmental data is only ever recorded when the road the vehicle is on is categorized as public or when at least a part of the overlaid characteristic depiction of the public road can be identified in the environmental data gathered by at least one environmental sensor of the vehicle.

2. The method of claim 1, wherein the identification of the road the vehicle is on is categorized as public or when at least a part of the overlaid characteristic depiction of the public road can be identified in the environmental data gathered by at least one environmental sensor of the vehicle is based on a computational comparison of the gathered environmental data and the characteristic depiction overlaid on the gathered environmental data with positional accuracy.

3. The method of claim 1, wherein the existing database is an SD or HD map of the environment of the vehicle from which the category of the road is retrieved and the characteristic depiction is determined.

4. The method of claim 3, wherein when a categorization of a road is unclear, additional information is retrieved from the vehicle-external server for the categorization, wherein when a road cannot be unequivocally categorized as public, the road is categorized as non-public and is used as a basis of the further method.

5. The method of claim 1, wherein the characteristic depiction of the public road is formed by a series of anchor points formed along a course of the public road using the existing database.

6. The method of claim 5, wherein a window is formed around each of the anchor points for an area of which window the identifiability is checked individually in each case, wherein the identification of a single anchor point is enough to trigger the recording.

7. The method of claim 5, wherein anchor points of the anchor points, which, when viewed from the gathered position of the vehicle, identified using the existing database as being anchor points concealed by objects, are not taken into account in the overlaying overlying the characteristic depiction with the gathered environmental data with positional accuracy and the checking of the identifiability.

8. The method of claim 1, wherein the characteristic depiction of the public road is formed by a traverse along the road.

9. The method of claim 8, wherein when a course of the traverse is partially concealed by objects identifiable in the existing database when viewed from a position of the vehicle, the traverse is divided into two or more part-traverses that omit the objects concealing the course of the traverse.

10. The method of claim 9, wherein for the traverse or each of the part-traverses, the identifiability of the characteristic depiction in the gathered environmental data is checked, wherein the recording is triggered if at least one part-traverse is identified.

11. The method of claim 1, wherein the characteristic depiction of the public road is formed by an image of the road, wherein the image of the road is compared section by section with the gathered environmental data, wherein each of the sections of the image of the road comprises at least one pixel.

12. The method of claim 11, wherein areas having at least one section in which a dynamic object has been identified in the gathered environmental data are excluded from the identifiability check.

13. The method of claim 1, wherein gradients of the gathered environmental data are calculated in an area of the characteristic depiction overlaid in each case, a histogram of oriented gradients is calculated, a similarity of the calculated histogram of oriented gradients to an initial direction vector of the characteristic depiction of the public road from the database is calculated for each of the areas.

14. The method of claim 13, wherein the method uses anchor points as a characteristic depiction and an initial direction vector corresponds to a vector at a respective anchor point.

15. The method of claim 14, wherein the initial direction vector in the existing database is calculated using a histogram of oriented gradients, wherein a steepest vector is used as initial direction vector.

16. The method of claim 14, wherein the similarity is calculated using a comparison of steepest vectors.

* * * * *